June 19, 1923.
G. VON POST
1,459,272
AUTOMATIC BALANCE WEIGHING APPARATUS
Filed Aug. 28, 1920
3 Sheets-Sheet 1
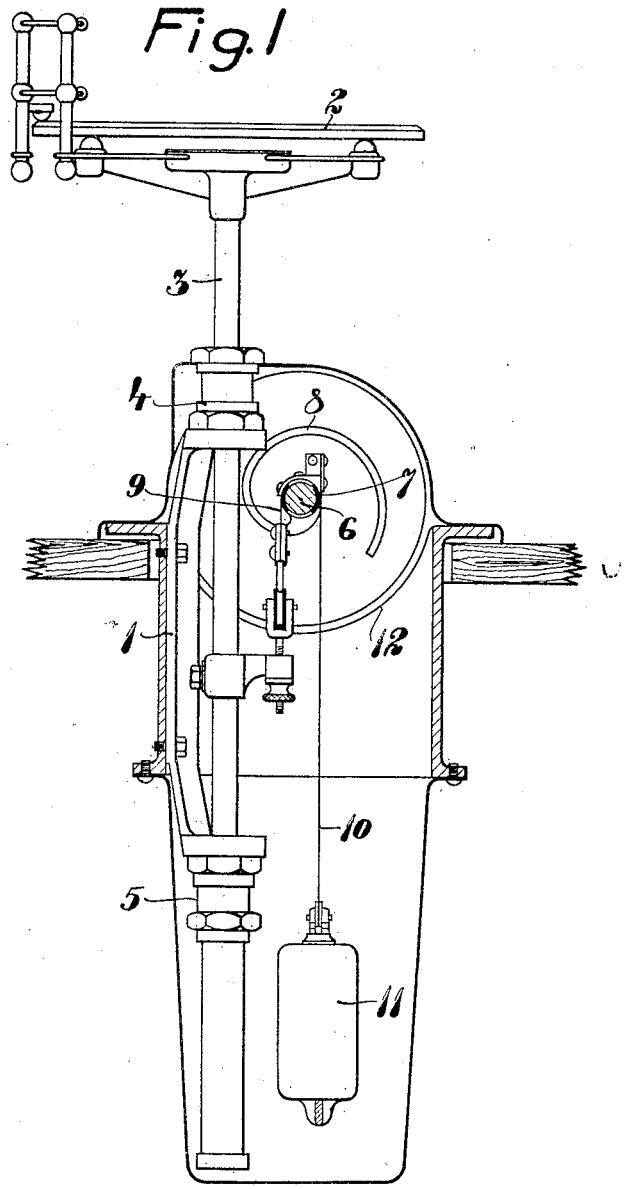

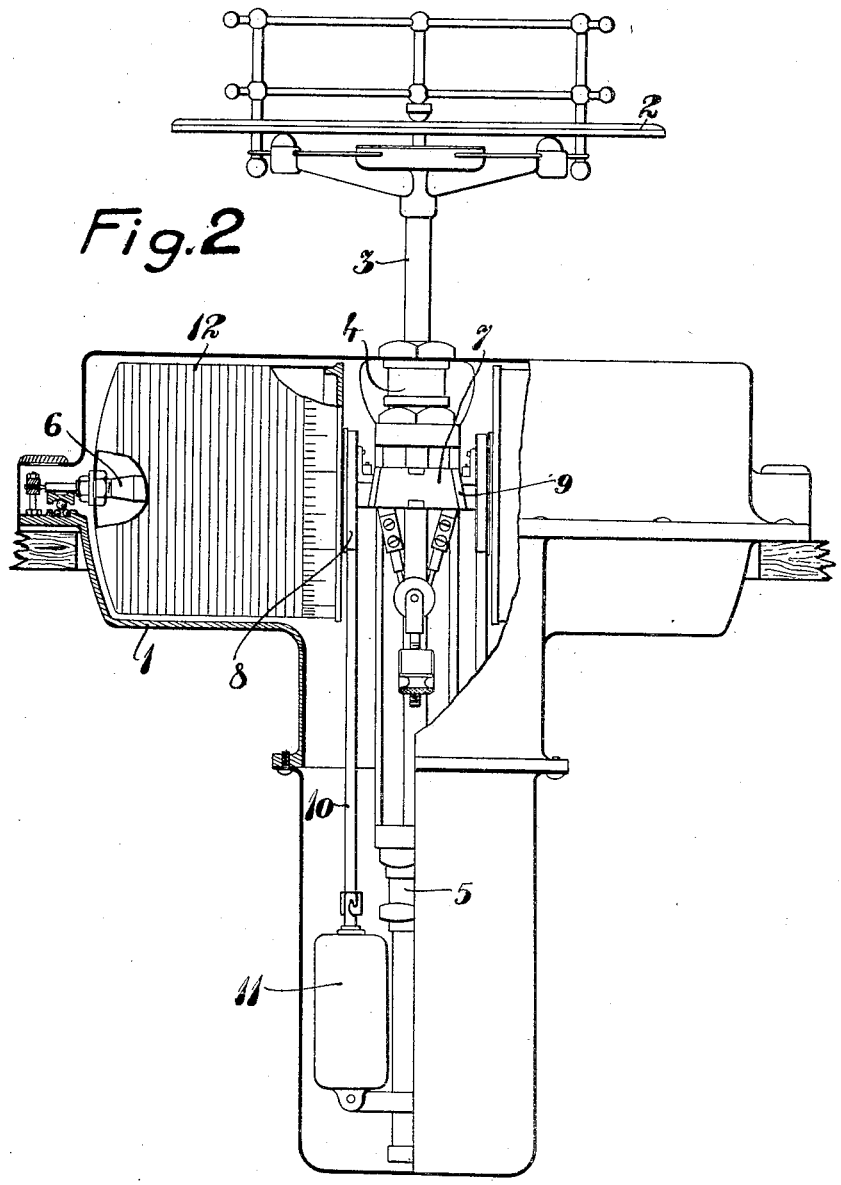

June 19, 1923. 1,459,272
G. VON POST
AUTOMATIC BALANCE WEIGHING APPARATUS
Filed Aug. 28, 1920  3 Sheets-Sheet 3
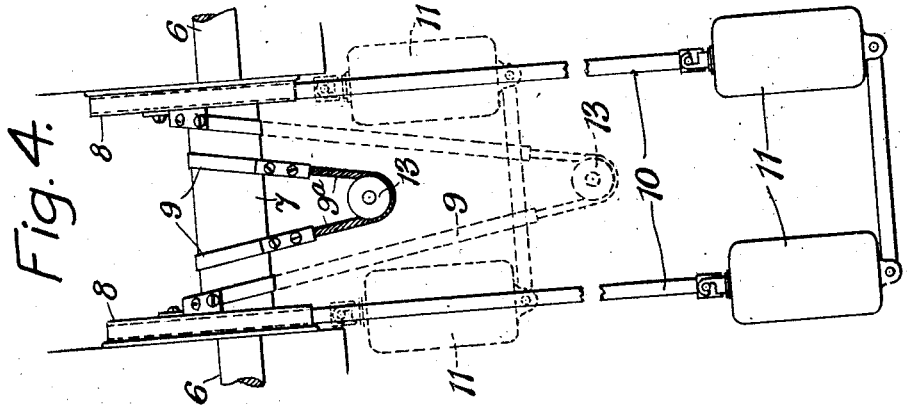
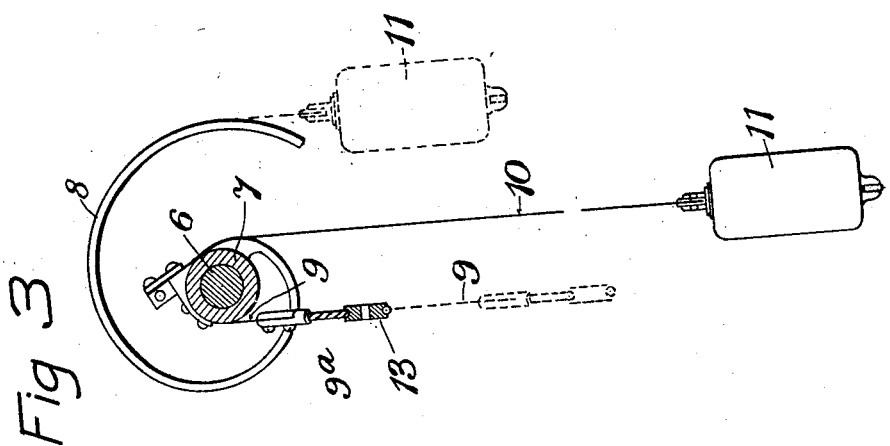
INVENTOR
Gustaf von Post
BY
ATTORNEY Patented June 19, 1923.

1,459,272

UNITED STATES PATENT OFFICE.

GUSTAF von POST, OF NEW YORK, N. Y.

AUTOMATIC BALANCE-WEIGHING APPARATUS.

Application filed August 28, 1920. Serial No. 406,589.

*To all whom it may concern:*

Be it known that I, GUSTAF VON POST, a subject of the King of Sweden, residing at New York city, New York, have invented new and useful Improvements in Automatic Balance-Weighing Apparatus, of which the following is a specification.

This invention relates to improvements in automatic balance weighing apparatus in which the load and the counter-weight act on flexible members wound in opposite directions on cams attached to a shaft and forming with said shaft the weighing beam proper.

As is well known, such balance weighing apparatus have hitherto been so constructed as to only permit a maximum turning movement of the beam which usually amounts to about 60° because of the bearing of the beam consisting of knife-edge pivots. Owing thereto, it is possible, only in case or weighing apparatus adapted for very small loads, to fix the movable member of a mechanism adapted to indicate the deviation and comprising an index and a scale, directly to said beam, as the deviations which will then result, are too small to enable a distinct reading off. It is proposed to overcome said inconvenience by mounting at the side of the beam an additional indicating mechanism, preferably consisting of a graduated, rotating drum or disk so connected, as by means of a suitable transmission mechanism, to the beam that a rotation of the latter corresponding to the largest angle of deviation thereof will result in a complete rotation of the drum or disk. By this it will be obtained that the whole periphery of the drum or disk may be made use of for applying the graduated scale or scales thereby securing the largest possible and most distinct graduation for a given size of the indicating drum.

The device as thus far described suffers, however, from the very great difficulty that the indicating drum requires a special mounting, the friction of which together with the friction inherent to the transmission inserted between the drum and the beam prevents, to a more or less extent, the beam from assuming its proper position of balance. As, furthermore, already a very small incorrectness as to the adjustment of the beam is enlarged due to the transmission directly proportional to the ratio of transmission, which results in a comparatively large incorrectness in the turning of the index on the scale, it is evident that such device cannot sufficiently satisfy their purpose as the large turning of the indicating mechanism will in this case be obtained at the cost of the sensitiveness and accuracy of the weighing apparatus.

I have found that it is possible to fix the movable member of the indicating mechanism directly to the beam and yet obtain the desired rotation of the indicating mechanism by mounting the shaft of the beam in a ball or roller bearing. The above said special mounting of the indicating drum as well as the transmission gearing between the latter and the beam may in this case be completely omitted whereby also the inconveniences inherent thereto will be overcome. It should be understood that the construction of the weighing apparatus will thereby be considerably simplified.

Referring to the accompanying drawings Figure 1 is a cross section of a weighing apparatus according to this invention. Fig. 2 is a front elevation, partly in section, of said apparatus. Figure 3, is a side view of the cams. Figure 4, is a front view thereof.

In the drawings the numeral 1 indicates the base or housing of the weighing apparatus in which a stem 3 supporting the goods receiver 2 reciprocates up and down. The stem 3 is guided by two bearings 4 and 5 said bearings being so constructed as to permit a longitudinal displacement of the stem without any appreciable friction. It is to be understood, however, that said bearings may be replaced by other suitable bearings. Mounted in the upper portion of the base is the beam in the shape of a horizontal shaft 6 carrying two cams 7 and 8, a flexible strip 9 or 10, respectively, being led over each of said cams. Suspended in the strip 9 is the stem 3 supporting the goods receiver while the strip 10 carries a constant counter weight 11. The ends of the shaft 6 according to this invention are mounted in a ball or roller bearing in such a way as to be capable of performing a complete revolution or more than one revolution. The cam 7 is cylindrical in shape and arranged concentrically to the shaft 6 of the beam, while the cam 8 serving to support the constant counter weight 11 is shaped as a curve so that the suspending point of the counter weight on the beam and thus also the lever arm by means of which said counter weight acts on the beam to turn same varies in a determined relation to the rotation of the beam. The lever arm by means of which the variable load placed on the goods receiver 2 acts on the beam to turn same in the opposite direction, will, however, be constant due to the cylindrical shape of the cam 7. According to the invention the beam with its cams 7, 8 is further so shaped and the variable load as well as the counter weight are so connected with the beam that the latter is capable of maintaining the balance between said variable load and said counter weight in any angular position of the beam. This result is obtained on the one hand by so forming the cams 7 and 8, the latter of which forms an involute of a circle, that they will extend around the shaft of the beam to an angle corresponding to the largest angle of deviation of the beam, the flexible strips being at the same time so connected with their respective cams that they will always wind themselves on new parts thereof and will not contact with the parts of the strips already wound in case the beam performs more than one revolution. As to the involute cam 8 this result is obtained directly by the shape of the cam, this being however not the case with the cylindrical cam 7. In order to obtain such a winding of the strip 9 the latter is so connected to the cylindrical cam and so guided in relation thereto as to be wound on or wound off the cam in an oblique direction along a screw line, as shown in Fig. 2, the strip at the same time bearing with its flat surface against the periphery of the cam. From this figure it is also seen that the strips 9 are used in pairs and so interconnected at their ends as to guide each other. The flexible strips 9 are connected together by a flexible connection 9ª in the bight of which is supported a roller 13 attached to the vertically guided scale-pan post or support 3.

The arrangement of the beam and of the members connected thereto as above described enables the attachment without the aid of transmission devices of one or more indicating drums 12 directly to the beam and further permits the provision on said drum or on one of said drums of a graduated scale extending around the whole periphery of the drum. Thus a large and distinct turning of the indicating mechanism of the weighing apparatus is obtained in the simplest way possible, while obviating the difficulties mentioned above inherent to known constructions for same purpose.

While a particular type of automatic balance weighing apparatus is illustrated and described it is obvious that the invention is not limited in its application to this particular type and that the details of the invention may be varied without departing from the principle of the invention.

Having now described this invention, I declare that what I claim is:—

1. In automatic balance weighing apparatus, a rotatable shaft, a pair of flexible strips connected to the shaft and extending in oblique directions that approach to be wound around the shaft obliquely in different direction to prevent the parts of the strips from touching each other, a vertical shaft, bearings to guide the shaft for vertical movement, means connecting said shaft with adjacent convergent portions of said strips, a goods receiver on said shaft, another flexible strip, a cam on the shaft receiving said strip and having a surface of continuing excentricity to prevent said other strip from winding on itself, and a weight carried thereby.

2. In an automatic balance weighing apparatus, a rotatable shaft, a pair of nonhelical, spiral cams thereon spaced apart, weights suspended on said cams, said shaft having a smooth portion between said cams, a pair of flexible strips connected at one end to said shaft at each side of said smooth portion, a flexible connection between the other ends of said strips and a vertically guided scale pan support, supported in said connection.

3. In automatic balance weighing apparatus, a rotatable shaft having a smooth strip supporting surface, a pair of flexible, obliquely directed strips connected at one end to said shaft that approach one another when winding on said smooth surface obliquely in different directions to prevent the turns of the strip from touching each other, a flexible connection connecting the opposite ends of said strips, a vertically-guided, movable, scale-pan supporting means suspended in said connection to move in a vertical line between divergent lines passing obliquely in different directions through the respective strips in the direction of the shaft, a cam on said shaft, another flexible strip supported by said cam, and a weight connected to the last mentioned strip.

In testimony whereof I have signed my name.

GUST. von POST.